United States Patent
Stönner et al.

(10) Patent No.: US 6,558,452 B1
(45) Date of Patent: May 6, 2003

(54) METHOD FOR OBTAINING AMMONIA FROM WASTE WATER CONTAINING NH₃ AND ACID GASES

(75) Inventors: Hans-Martin Stönner, Eschborn (DE); Gert Ungar, Frankfurt am Main (DE); Matthias Linicus, Eppstein (DE)

(73) Assignee: MG Technologies AG, Frankfurt am Main (DE)

( * ) Notice: Subject to any disclaimer, the term of this patent is extended or adjusted under 35 U.S.C. 154(b) by 0 days.

(21) Appl. No.: 09/830,220

(22) PCT Filed: Oct. 19, 1999

(86) PCT No.: PCT/EP99/07910

§ 371 (c)(1),
(2), (4) Date: May 30, 2001

(87) PCT Pub. No.: WO00/23379

PCT Pub. Date: Apr. 27, 2000

(30) Foreign Application Priority Data

Oct. 21, 1998 (DE) .......................... 198 48 499

(51) Int. Cl.⁷ .................. B01D 19/00; C02F 1/02
(52) U.S. Cl. .................. 95/245; 95/251; 203/80; 210/774; 210/903
(58) Field of Search ............... 95/243, 245, 251, 95/263; 96/202, 218, 267, 299, 300; 210/180, 182, 188, 195.1, 903, 774, 805, 806; 202/154, 158; 203/71, 80; 423/237, 352, 357

(56) References Cited

U.S. PATENT DOCUMENTS 3,335,071 A * 8/1967 Bollen et al.
3,404,072 A * 10/1968 Bollen et al.
3,972,693 A * 8/1976 Wiesner et al.
4,060,591 A * 11/1977 Garber et al. ............... 423/237
4,111,759 A * 9/1978 Didycz et al. ............... 423/357
4,594,131 A * 6/1986 Maier ........................... 203/80
4,738,754 A * 4/1988 Hilsebein et al. ............. 203/80

* cited by examiner

Primary Examiner—Joseph W. Drodge
(74) Attorney, Agent, or Firm—Herbert Dubno; Jonathan Myers

(57) ABSTRACT

Ammonia is recovered from waste water containing NH₃, at least one acid gas (CO₂, H₂S) and inert gases. Firstly, the waste water is passed through a pretreatment column and then, at least in part, into a total stripping column. The top product from the total stripping column is cooled in a condenser, and an aqueous NH₃-containing condensate coming from the condenser is fed to an NH₃ stripping column. The top product from the NH₃ stripping column is brought into direct contact with circulating aqueous NH₃-containing condensate in a wash column, and NH₃ is recovered from the top product from the wash column. Some of the bottom product from the wash column is fed back into the NH₃ stripping column. The temperature in the bottom region of the pretreatment column is set to from less than 30 to 200° C., a sub-stream of the waste water is introduced into the upper region of the pretreatment column, and a second sub-stream of the waste water is fed into the pretreatment column below the first sub-stream. At least 80% of the NH₃ introduced from the total stripping column is condensed in the condenser. A waste-water stream is taken off from the total stripping column, at least part thereof is cooled to temperatures of from 10 to 60° C., and the cooled waste-water stream is passed into the top region of the pretreatment column.

5 Claims, 1 Drawing Sheet

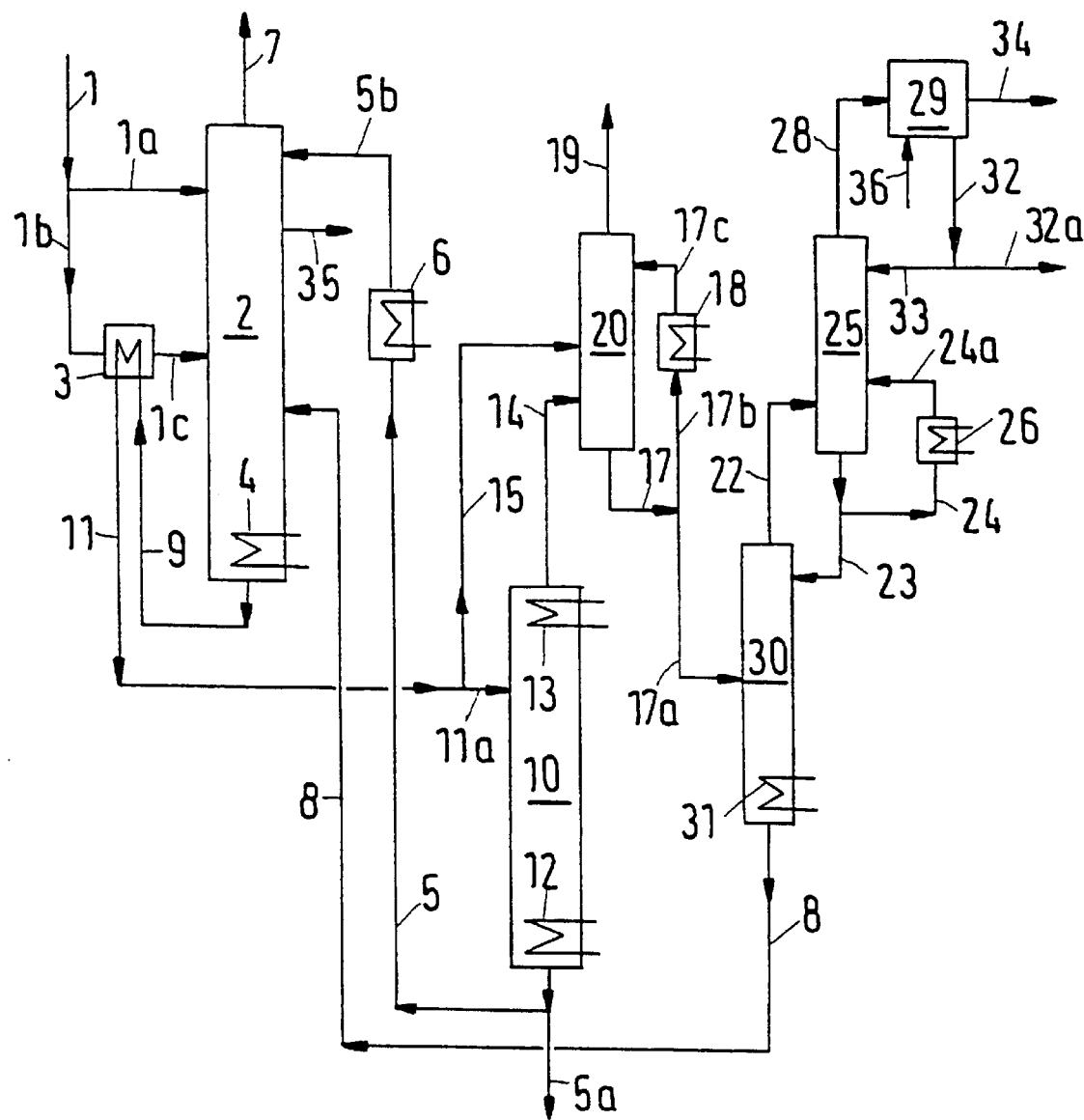

METHOD FOR OBTAINING AMMONIA FROM WASTE WATER CONTAINING $NH_3$ AND ACID GASES

This application is a 371 of PCT/EP99/07910, filed on Oct. 19, 1999.

DESCRIPTION

The invention relates to a process for the recovery of ammonia from waste water containing $NH_3$, at least one acid gas ($CO_2$ and/or $H_2S$) and inert gases, which is firstly passed through a pretreatment column and then applied, at least in part, to a total stripping column, in which process a top product from the total stripping column which comprises $NH_3$ and acid gas is fed to a condenser, in which the top product is scrubbed with circulated and cooled condensate, an aqueous $NH_3$-containing condensate coming from the condenser is fed to an $NH_3$ stripping column, whose top product is brought into direct contact with circulating aqueous $NH_3$-containing condensate in a wash column, $NH_3$ is obtained from the top product from the wash column, and some of the bottom product from the wash column is fed back into the $NH_3$ stripping column. The waste water, which always comprises at least one of the acid gases $CO_2$ and/or $H_2S$, may also comprise, for example, HCN.

A process of this type is disclosed in EP-B-0 212 690. The pretreatment column here is designed as a simple stripping column, and consequently the treated waste water still contains a considerable part of the impurities that are difficult to remove. This results in ammonia water finally obtained likewise having a relatively high content of impurities.

The invention has the object of modifying the known process in such a way that the burden on the wash column upstream of the $NH_3$ recovery is reduced, and clean, aqueous $NH_3$ can be produced. This is achieved according to the invention in the process mentioned at the outset in that the pretreatment column is provided with heating of the bottom region, and the temperature in the bottom region is from 130 to 200° C., in that a sub-stream of the waste water is introduced into the upper region of the pretreatment column and a second sub-stream of the waste water is passed into the pre-treatment column below the first sub-stream, in that at least 80% and preferably at least 95% of the $NH_3$ present in the top product from the total stripping column is condensed in the condenser, and in that a waste-water stream is taken off from the total stripping column, at least part of the waste-water stream is cooled to temperatures of from 10 to 60° C., and the cooled waste-water stream is passed into the top region of the pretreatment column.

Inert gases and acid gases ($CO_2$ and $H_2S$) are removed very effectively in the pretreatment column, which reduces the burden on the downstream columns. This results, inter alia, in it being possible to condense all of the top product from the total stripping column. It is also possible to adjust the pressure in the wash column while nevertheless obtaining clean ammonia water.

The pressure in the pretreatment column is usually in the range from 1 to 20 bar and is preferably at least 2 bar. The second sub-stream of the waste water, which is passed into the pretreatment column below the feed point of the first sub-stream, is preferably preheated to temperatures of at least 50° C. and preferably at least 80° C. by indirect heat exchange with the waste water coming from the bottom of the pretreatment column.

It is advantageous to pass from 1 to 40% of the waste water taken off from the bottom of the pretreatment column into the condenser while bypassing the total stripping column. In this way, the load in the total stripping column can be regulated and its heating demand optimized.

Possible embodiments of the process are explained with the aid of the drawing, which shows a flow chart of the process.

The waste water to be treated is supplied in line (1). It comes, for example, from a refinery or a plant for coal gasification. The waste water comprises $NH_3$ as valuable substance and in addition numerous further components, in particular one or more acid gases, such as $CO_2$ and/or $H_2S$, also inert gases and possibly HCN and also residues of hydrocarbons or solvents. A first sub-stream of the waste water is introduced through line (1a) into the upper region of a pretreatment column (2). The remaining waste water is fed through line (1b) and, before entry into column (2) through line (1c), for example in its central region, is warmed to at least 50° C. and preferably at least 80° C. in the indirect heat exchanger (3). The pretreatment column (2) and the other columns contain trays known per se or alternatively packing elements. The bottom region of column (2) is provided with heating (4), enabling temperatures of from 130 to 200° C. to be achieved therein.

Some of the waste water obtained in a total stripping column (10) is fed through lines (5) and (5b) to the top of column (2) after the waste water has been passed through a condenser (6) and adjusted to temperatures in the range from 10 to 60° C. A further waste-water stream comes from an $NH_3$ stripping column (30) and is fed through line (8) to the lower part of column (2). Stripped gases and vapors leave column (2) in line (7).

If necessary, a water-containing liquid stream comprising hydrocarbons and/or solvents is taken off through line (35) and fed to work-up, which is not shown.

The waste water obtained at the bottom of column (2) is taken off in line (9), fed through heat exchanger (3) for cooling and then applied to the total stripping column (10) in lines (11) and (11a). In column (10), it is ensured that all the free $NH_3$ and remaining acid gases are removed from the waste water. To this end, column (10) is fitted with bottom heating (12), by means of which the bottom liquid is brought to temperatures of from 100 to 180° C. Column (10) furthermore contains top cooling (13). It may be advantageous from a control engineering point of view to branch off a sub-stream of from 1 to 40% of the waste water coming from the heat exchanger (3) and supplied in line (11) and to feed it through line (15) into the condenser (20). A sub-stream of the waste water taken off from column (10) is removed through line (5a) and can be fed, for example, to biological waste-water treatment.

The $NH_3$-rich top product from column (10) is fed through line (14) into a condenser (20), which is likewise fitted with trays or packing elements. Condensate coming from condenser (18) and partially circulated through lines (17) and (17b) is introduced into the upper region of condenser (20) through line (17c). The gas mixture taken off from condenser (20) in line (19) comprises mainly inert gases.

The condensate in line (17) is split over lines (17a) and (17b). Line (17a) leads to the $NH_3$ stripping column (30), which is likewise fitted with heating (31). The bottom liquid from column (30) is fed back to the pretreatment column (2) through line (8) in the manner already explained. The top product is introduced through line (22) into the wash column (25), whose design and mode of operation is described in detail in EP-B-0 212 690. Some of the liquid flowing out in column (25) is fed back into column (30) through line (23), and the remaining liquid is fed back into the lower region of column (25) by means of the circuit through line (24) and condenser (26). Column (25) is preferably designed as a Wetted-wall column divided into several sections, the pressure being in the range from 1 to 20 bar and the temperatures being from 20 to 100° C.

A gas mixture consisting principally of $NH_3$ is taken off from the top of column (25) in line (28) and fed to ammonia liquefaction (29), from which liquid ammonia is taken off in line (34) and/or ammonia water is taken off in line (32). Some of the ammonia water is fed back to the top of column (25) through line (33), and the remainder is available in line (32a) as a further valuable product. It is possible to generate either aqueous or liquid ammonia or both products. If necessary, water is supplied in line (36).

EXAMPLE 1

Waste water from a petroleum refinery which has been pretreated in a 3-phase separator is passed through line (1) to the work-up shown in the drawing, where aqueous ammonia is produced. Line (34) is superfluous. After pretreatment in the 3-phase separator, the waste water still contains small amounts of hydrocarbons, which are taken off via line (35).

The following table shows the amounts (in kg/h) of the principal components $H_2O$, $NH_3$, $H_2S$ and $CO_2$ and the pressure and temperature for the most important lines; some of the data are calculated. The waste water in line (1) also contains inert gases (for example $H_2$), which are taken off via line (7). Inert-gas residues leave the work-up through line (19).

TABLE

| Line | $H_2O$ | $NH_3$ | $H_2S$ | $CO_2$ | T (°C.) | p(bar) |
|---|---|---|---|---|---|---|
| 1 | 44870 | 851 | 900 | 1000 | 35 | 13 |
| 1a | 4711 | 89 | 95 | 105 | 35 | 13 |
| 1c | 40159 | 762 | 805 | 895 | 139 | 12.5 |
| 5b | 1820 | 0.1 | 0 | 0 | 35 | 3.5 |
| 5a | 45320 | 2 | 0.2 | 0 | 144 | 4 |
| 7 | 8 | 0.1 | 899.8 | 1000 | 45 | 10.7 |
| 8 | 4401 | 1800 | 540 | 37 | 75 | 3.5 |
| 9 | 51083 | 2651 | 540 | 37 | 165 | 11 |
| 11a | 48400 | 2512 | 512 | 35 | 86 | 11 |
| 14 | 1260 | 2510 | 512 | 35 | 110 | 4 |
| 15 | 2683 | 139 | 28 | 2 | 86 | 11 |
| 17a | 3943 | 2649 | 540 | 37 | 56 | 4 |
| 17c | 92849 | 62378 | 12716 | 871 | 47 | 4 |
| 22 | 21 | 1130 | 6 | 0.2 | 45 | 3.4 |
| 23 | 479 | 281 | 6 | 0.2 | 44 | 3.3 |
| 24a | 5578 | 3272 | 70 | 2.3 | 40 | 3.3 |
| 28 | 21 | 1009 | 0 | 0 | 45 | 3 |
| 32a | 2548 | 849 | 0 | 0 | 45 | 3 |
| 33 | 479 | 160 | 0 | 0 | 45 | 3 |
| 36 | 3006 | 0 | 0 | 0 | 30 | 4 |

Various lines contain traces of $H_2S$ and/or $CO_2$ in the ppm region, but this is not taken into account in the above table. The inert gases taken off in line (19) likewise contain traces of $NH_3$ and acid gases.

What is claimed is:

1. A process for the recovery of $NH_3$ from a waste water containing $NH_3$, at least one acid gas selected from the group consisting of $CO_2$ and $H_2S$, and an inert gas, which comprises the steps of:

(a) dividing the waste water containing $NH_3$, at least one acid gas selected from the group consisting of $CO_2$ and $H_2S$, and an inert gas into a first waste water sub-stream and a second waste water sub-stream;

(b) providing a pretreatment column with a heating means at the bottom to heat the bottom to a temperature of 130 to 200° C., introducing the first waste water sub-stream into an upper region of the pretreatment column, and the second waste water sub-stream into the pretreatment column at a location below the upper region of the pretreatment column where the first waste water sub-stream was introduced, to pretreat both the first and the second waste water sub-streams to remove the at least one acid gas from the waste water thereby providing a waste water stream at the bottom of said pretreatment column having undergone removal of said at least one acid gas;

(c) cooling the waste water stream at the bottom of said pretreatment column and channeling in part the waste water stream from the bottom of said pretreatment column to a total stripping column to obtain a top product comprising $NH_3$ and at least one acid gas, and a bottom product comprising a waste-water stream, cooling the top product, and condensing at least 80% of the $NH_3$ present in the top product in a condenser in which the top product is scrubbed with circulated and cooled condensate to obtain a waste gas comprising the inert gas and an aqueous $NH_3$-containing condensate while channeling 1 to 40% of the waste water having undergone removal of the at least one acid gas according to step (b) directly from the bottom of said pretreatment column to the condenser thereby avoiding the total stripping column to obtain additional waste gas comprising the inert gas and additional aqueous $NH_3$-containing condensate;

(d) cooling the waste-water stream obtained as a bottom product from the total stripping column according to step (c) to a temperature of 10 to 60° C. and passing the cooled waste-water stream to the top region of the pretreatment column according to step (b);

(e) splitting the $NH_3$-containing condensate obtained from the condenser during step (c) into two portions, recirculating a first portion of the $NH_3$-containing condensate back to the condenser in step (c) to condense additional quantities of $NH_3$ present in the top product, and from a second portion of the $NH_3$-containing condensate stripping $NH_3$ in an $NH_3$-stripping column to obtain $NH_3$ vapor at the top and a waste stream at the bottom; and (f) washing the $NH_3$ vapor with circulating $NH_3$-containing condensate in a wash column and recovering $NH_3$ as a top product from the wash column, said $NH_3$ free of said acid gas and said inert gas, while obtaining a bottom product from the wash column, said bottom product recirculated to the $NH_3$-stripping column in step (e).

2. The process defined in claim 1 wherein according to step (b) the pressure in the pretreatment column according to step (b) is from 1 to 20 bar.

3. The process defined in claim 1 wherein according to step (b) a second waste water stream is taken off from the pretreatment column, said second waste water stream taken off from the top of said column and comprising hydrocarbons or solvents.

4. The process defined in claim 1 wherein according to step (e) a substream of the waste water from the bottom of the $NH_3$-stripping column is fed into the pretreatment column of step (b).

5. A process for the recovery of $NH_3$ from a waste water containing $NH_3$, at least one acid gas selected from the group consisting of $CO_2$ and $H_2S$, and an inert gas, which comprises the steps of:

(a) dividing the waste water containing $NH_3$, at least one acid gas selected from the group consisting of $CO_2$ and $H_2S$, and an inert gas into a first waste water sub-stream and a second waste water sub-stream;

(b) providing a pretreatment column with a heating means at the bottom to heat the bottom to a temperature of 130 to 200° C., introducing the first waste water sub-stream into an upper region of the pretreatment column, and the second waste water sub-stream into the pretreatment column at a location below the upper region of the pretreatment column where the first waste water sub-stream was introduced, to pretreat both the first and the second waste water sub-streams to remove the at least one acid gas from the waste water thereby providing a waste water stream at the bottom of said pretreatment column having undergone removal of said at least one acid gas;

(c) cooling the waste water stream at the bottom of said pretreatment column and channeling in part the waste water stream from the bottom of said pretreatment column to a total stripping column to obtain a top product comprising $NH_3$ and at least one acid gas, and a bottom product comprising a waste-water stream, cooling the top product, and condensing at least 80% of the $NH_3$ present in the top product in a condenser in which the top product is scrubbed with circulated and cooled condensate to obtain a waste gas comprising the inert gas and an aqueous $NH_3$-containing condensate;

(d) cooling the waste-water stream obtained as a bottom product from the total stripping column according to step (c) to a temperature of 10 to 60° C. and passing the cooled waste-water stream to the top region of the pretreatment column according to step (b);

(e) splitting the $NH_3$-containing condensate obtained from the condenser during step (c) into two portions, recirculating a first portion of the $NH_3$-containing condensate back to the condenser in step (c) to condense additional quantities of $NH_3$ present in the top product, and from a second portion of the $NH_3$-containing condensate stripping $NH_3$ in an $NH_3$-stripping column to obtain $NH_3$ vapor at the top and a waste stream at the bottom; and (f) washing the $NH_3$ vapor with circulating $NH_3$-containing condensate in a wash column and recovering $NH_3$ as a top product from the wash column, said $NH_3$ free of said acid gas and said inert gas, while obtaining a bottom product from the wash column, said bottom product recirculated to the $NH_3$-stripping column in step (e).

* * * * *